INVENTOR.
ROBERT W. DRAKE.

Dec. 11, 1951     R. W. DRAKE     2,577,725
ECCENTRIC BALL VALVE FOR HIGH-PRESSURE LINES
Filed Sept. 29, 1944     2 SHEETS—SHEET 2
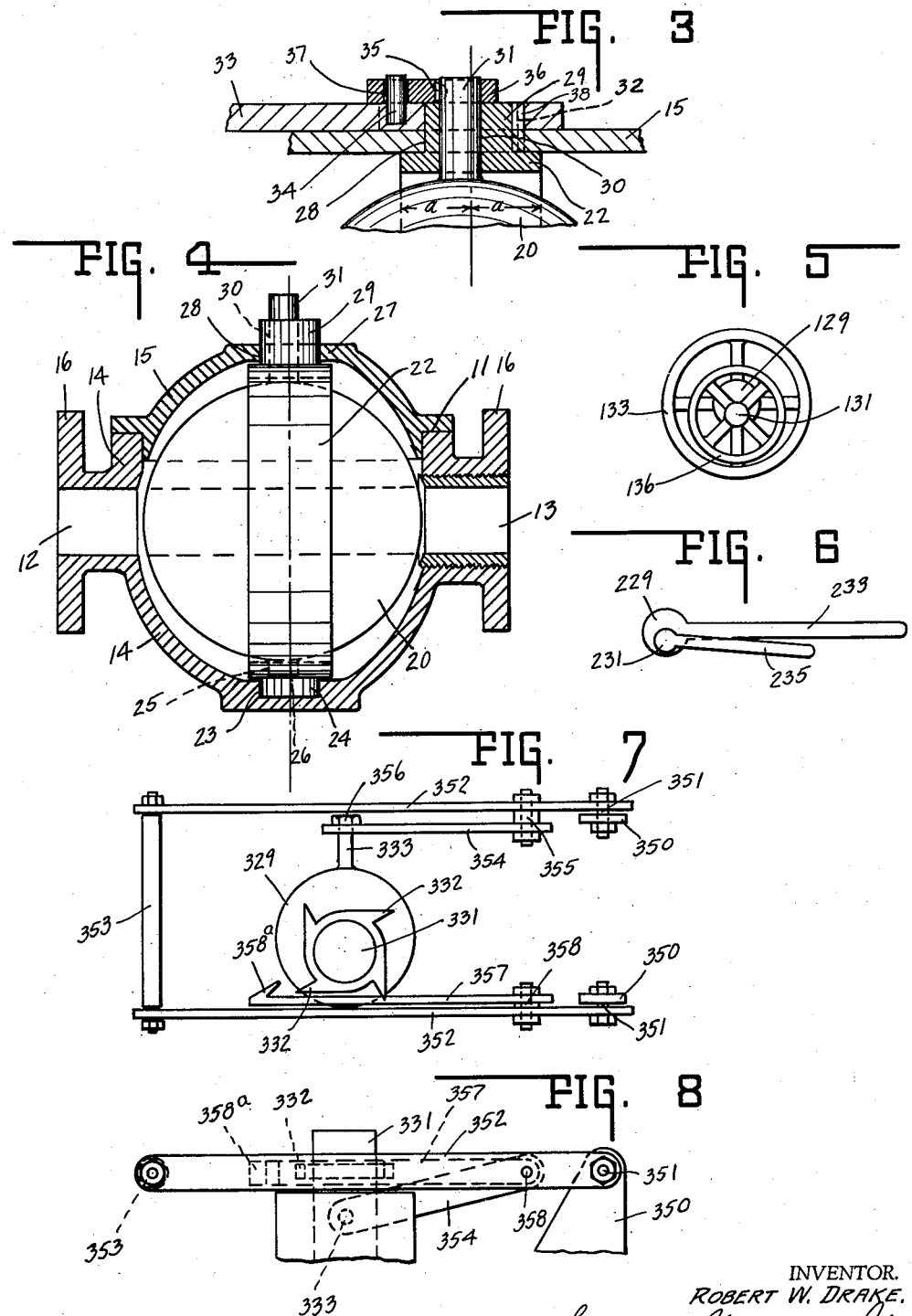
INVENTOR.
ROBERT W. DRAKE.
BY Lockwood Goldsmith & Galt,
ATTORNEYS.

Patented Dec. 11, 1951

2,577,725

UNITED STATES PATENT OFFICE 2,577,725

ECCENTRIC BALL VALVE FOR HIGH-PRESSURE LINES

Robert W. Drake, Tulsa, Okla.

Application September 29, 1944, Serial No. 556,379

10 Claims. (Cl. 251—91)

This invention relates to a high pressure control valve structure.

For example, in certain industries it is not unusual to handle fluids in lines of six inches diameter more or less and at pressures of five hundred (500#) pounds per square inch more or less. A valve in such a line has an area of approximately 4.7 square inches so that line pressure on the valve holding it to its seat is well over a ton which is such a load that with any standard valve the opening thereof would be impossible. Accordingly sliding gate valves have been employed under these conditions.

The present invention contemplates the solution of this problem by providing an eccentric movable mounting for the valve, so that by a compound action the valve can be easily opened and closed notwithstanding the aforesaid ton or more load thereon.

The chief feature of the invention resides in a bored ball valve eccentrically mounted in a yoke in turn pivotally mounted whereby the valve may be rapidly and easily opened and closed which is not possible with a gate valve of a capacity to handle fluid of the same volume and pressure.

Other objects and features of the invention will be set forth more fully hereinafter.

The full nature of the invention will be understood from the accompanying drawings and the following description and claims:

In the drawings—

Fig. 3 is a vertical section through the single handle and an upper portion of the valve means operated thereby being shown in elevation.

Fig. 4 is a diagrammatic vertical section of the complete valve, the control means being omitted.

Fig. 5 is a diagrammatic plan view of a modified form of control.

Fig. 6 is a similar view of another modification of control means.

Fig. 7 is a similar view of a still further modification of control means.

Fig. 8 is a side elevation thereof.

Figure 1:
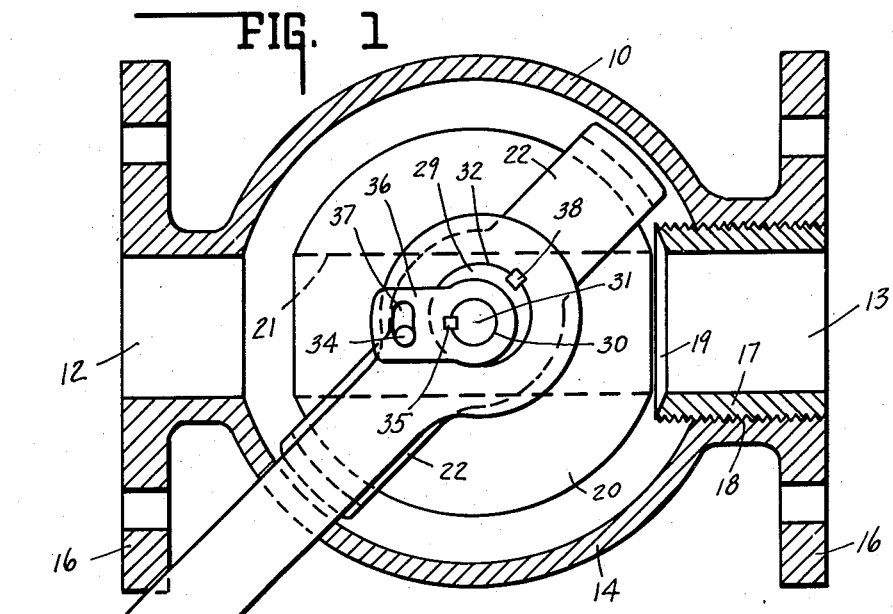
Fig. 1 is a horizontal central section of the casing and top plan view of the valve means therein together with one form of actuator, parts being shown in the valve open position.
Figure 2:
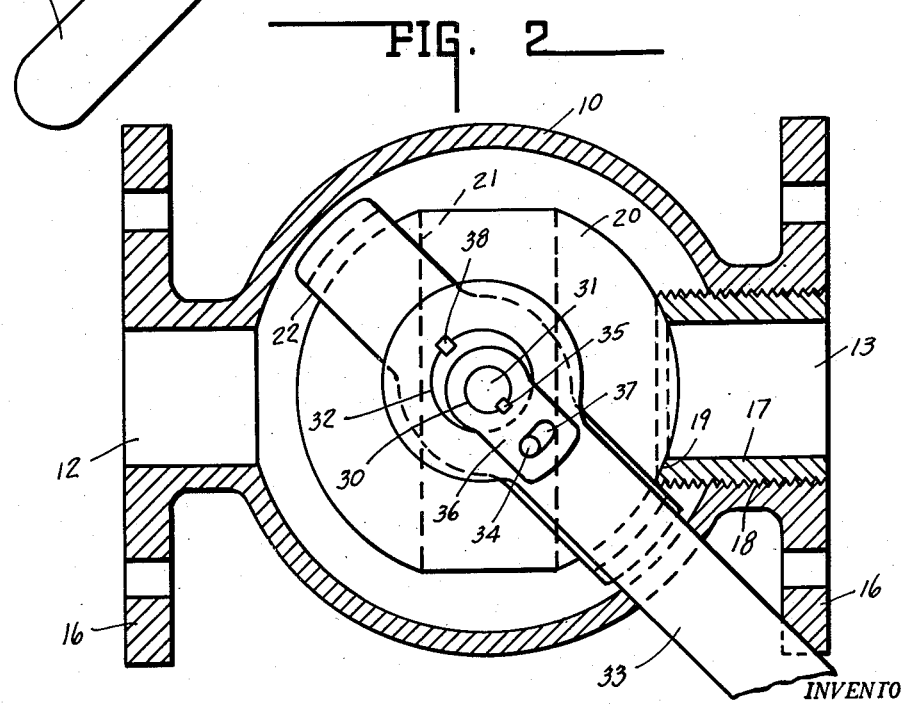
Fig. 2 is a similar view showing the parts in the valve closed position.

In Figs. 1 to 4 of the drawing 10 indicates a substantially spherical chambered casing or body which, see Fig. 4, may be parted as at 11 for valve means insertion, etc. Two aligned passages 12 and 13, see Figs. 1 and 2, are provided in the main body portion 14 as distinguished from the cap portion 15 thereof, see Fig. 4. Each passage terminates in a flange 16 by which the valve may be coupled to the adjacent ends of the pressure line, passage 12 being upstream or on the pressure side while passage 13 is downstream side thereof.

Herein outlet passage 13 is formed by an externally threaded member 17 threaded into threaded opening 18 aligned with passage 12. The inner end of member 17 terminates in a seat 19 that has a surface of ring-like form, tapered as it were but actually conforming to the spherical surface of ball 20. Ball 20 has a bore 21 therethrough so that when aligned with passages 12 and 13 unrestricted flow of pressure fluid through the valve will obtain.

Encircling ball 20, see Figs. 3 and 4, is a ring-like yoke 22. Casing portion 14 includes circular socket 23, see Fig. 4, in which is pivotally mounted trunnion 24 on the yoke 22. The yoke and trunnion has an eccentrically positioned socket 25 therein which confronts ball 20 and pivotally seats trunnion 26 carried by the ball 20. The cap 15 has the portion 27 opposite socket 23 and through portion 27 is bore 28 coaxially aligned with socket 23. Sleeve 29 is rigid with yoke 22 and is coaxially aligned with the socket 23 and trunnion 24. Sleeve 29 projects beyond cap portion 27. Associated with this extension of sleeve 29 is the means for pivoting the yoke in the casing.

The bore 30 in sleeve 29 is eccentric of the axis of the sleeve and said bore is aligned with eccentrically positioned socket 25 in the ring yoke 22 and trunnion 24. Valve 20 carries a stem 31 which is coaxial with trunnion 26. Stem 31 is appreciably longer than sleeve 29, hence extends beyond the end of said sleeve.

Reference will now be had to Figs. 1 to 3. The casing exposed end of sleeve 29 is keyed at 38 in bore 32 of hand lever 33 which herein mounts pin 34 projecting parallel to stem 31. Stem 31 has keyed, as at 35, an arm 36 having an arcuate slot 37 therein of slight length, that is several degrees. Pin 34 rides in said slot. Reference now will be had more particularly to Figs. 1 and 2. The ball 20 is pressure seated at 19, see Fig. 2. Initial clockwise rotation of handle 33 from that position, due to the eccentricity of the axes of sleeve 29 and stem 31 initially rotates yoke 22 and ball 20 a slight amount. This movement backs the ball away from the seat 19.

Continued rotation (clockwise) of handle 33 then bodily rotates the ball 20 in the yoke 22 until the position (see Fig. 1) is attained. In this movement handle 33 rotates relative to the stem 31. The valve is closed in a reverse manner, that is, the ball is rotated 90° to near closed position and then seated at 19.

Accordingly the action is first to bodily move the ball away from the seat 19 and then to register bore 21 with passages 12 and 13 to permit free flow and all by the movement of a single lever approximately 90 degrees or a quarter turn. This of course is much less effort and requires much less time than rotating a gate valve control say twelve to fifteen revolutions to fully open such a valve, that is a valve capable of handling fluid having the volume and pressure stated.

Reverse rotation of the handle 33 similarly closes the valve as aforesaid.

In Fig. 5, 129 indicates the sleeve and 131 the stem of a similar valve structure. Hand wheel 136 is rigid therewith while hand wheel 133 is rigid with sleeve 129. In this form the controls for the ball and yoke are independent, wheel 136 being positioned more remote than hand wheel 133 from said ball valve.

In Fig. 6 sleeve 229 has hand lever 233 rigid therewith and stem 231 has arm 235 rigid therewith. In this form the stem and sleeve also are independently operated.

While not illustrated, herein, it is possible to provide rack teeth on the periphery of the stem and sleeve and have independent reciprocable racks actuate the stem and sleeve. Also worm wheel teeth may be formed thereon and independent rotatable worms actuate the stem and sleeve. In this latter arrangement the worms may be hand operable, but since that arrangement offers no advantage over the controls of Fig. 5, this worm and wheel form preferably is used for utilization when motor (power) rotation, directly, or indirectly or remotely controlled is desired.

Reference will now be had to Figs. 7 and 8. Herein sleeve 329 has an arm 333, similar to arms 233 and 33. Herein stem 331 has a toothed periphery 332. Mounted upon a pair of stationary standards 350 and at 351 are arms 352 connected together by handle 353. An arm 354 is pivoted at 355 upon the lever arm 352 and said arm 354 is connected to arm 333 as at 356. As the handle is raised arm 354 is raised as pivot 355 raises. Thus arm 354 pulls arm 333 clockwise in Fig. 7.

The opposite arm 357 is similarly pivoted at 358 upon the other main arm 352. As this arm moves to the right in Fig. 7 it, by reason of catch 358ª, engages one tooth 332 and hence stem 331, after sleeve 329 has partially rotated clockwise, rotates counterclockwise one quarter turn. This opens the valve by aligning the port therethrough with passages 12 and 13. The handle is then brought down. In so doing arm 354 returns sleeve 329 to its original position but catch 358ª rides past the next tooth 332. A second similar movement of the handle again rotates sleeve 329 clockwise and turns stem 331 another 90° counter-clockwise.

This single handle accordingly can open and close the valve by successively rotating step by step stem 331 90° and always in a counter-clockwise direction and also oscillate sleeve 329 at each step.

The three preferred species of control are those illustrated in Figs. 1, 2 and 3, Figs. 7 and 8, and an independent dual member control represented by any one of the intermediate disclosures.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A valve structure including a casing having an annular seat, a valve of ball form with a bore therethrough and pivotally mounted in the casing upon an axis transverse to both bore and seat, a yoke interposed between the ball and casing, said yoke having a ring-like form disposed about the ball, the ball rotation axis intersecting the yoke, the casing pivotally supporting the yoke at diametrically opposite points for rotation only, said casing having aligned inlet and outlet passages, the latter defined by said seat, the yoke at diametrically opposite points pivotally supporting the ball upon the aforesaid axis which is parallel to the pivot axis of the yoke and for rotation only relative to that axis, and means for pivoting both the ball and yoke for valve control.

2. A valve structure as defined by claim 1 wherein the yoke includes a sleeve portion coaxial with the yoke pivotal axis and projecting from the casing and the ball valve includes a stem portion coaxial with valve pivot axis and projecting through and from the sleeve and casing, said portions having operative connection with said pivoting means.

3. A valve structure as defined by claim 2 wherein the pivoting means comprises an arm rigid with the yoke, another arm rigid with the ball and a limited free movement connection between the arms.

4. A valve structure including a casing having an annular seat, a valve of ball form with a bore therethrough and pivotally mounted in the casing upon an axis transverse to both bore and seat, a yoke interposed between the ball and casing, said yoke having a ring-like form disposed about the ball, the ball rotation axis intersecting the yoke, the casing pivotally supporting the yoke at diametrically opposite points for rotation only, said casing having aligned inlet and outlet passages, the latter defined by said seat, the yoke at diametrically opposite points pivotally supporting the ball upon the aforesaid axis which is parallel to the pivot axis of the yoke and for rotation only relative to that axis, and means for pivoting both the ball and yoke for valve control, said yoke being oscillatable upon its pivotal axis and the ball being progressively rotatable to first register one end of bore with the seat, then non-register same, and then register the opposite end of the bore with said seat.

5. A valve structure as defined by claim 4 wherein the yoke includes a sleeve portion projecting through and from the casing and the ball includes a stem portion projecting from the sleeve and casing, said portions having operative connection with said pivoting means, the latter comprising a member for moving the stem portion, another member for moving the sleeve portion, said members having interconnection one with the other whereby movement of one effects successive pivotal movement of yoke and ball.

6. A valve structure structure as defined by claim 1 wherein said means includes a pair of arms, one for the ball and rigid therewith and the other for the yoke and rigid therewith, and a lost motion connection therebetween.

7. A valve structure as defined by claim 1 wherein said means includes a single oscillatable handle operatively connected to the yoke for oscillation thereof corresponding to handle initial oscillation and an arm operatively connected to the handle and the ball for pivoting of the ball only and during a major portion of the handle oscillation movement.

8. A valve structure as defined by claim 1 wherein said means includes a single oscillatable handle operatively connected to the yoke for oscillation thereof corresponding to handle initial oscillation and an arm operatively connected to the handle and the ball for pivoting of the ball only and during a major portion of the handle oscillation movement, the ball and handle arm connection including a pawl and ratchet structure.

9. A valve structure as defined by claim 1 wherein said means includes a single oscillatable handle operatively connected to the yoke for oscillation thereof corresponding to handle initial oscillation and an arm operatively connected to the handle and the ball for pivoting of the ball only and during a major portion of the handle oscillation movement, the ball and handle arm connection including a pin and pin seating, elongated slotted structure.

10. A valve structure as defined by claim 1 wherein the yoke includes a sleeve portion coaxial with the yoke pivotal axis and projecting from the casing and the ball valve includes a stem portion coaxial with the valve pivot axis and projecting through and from the sleeve and casing, said pivoting means comprising an arm rigid with the sleeve portion, another arm having operative association with the stem portion, a single handle for moving both arms, said second mentioned arm having a toothed formation and a toothed member rigid with the stem portion and associated with the toothed arm.

ROBERT W. DRAKE.

REFERENCES CITED

The following references are of record in the file of this patent:

UNITED STATES PATENTS

| Number | Name | Date |
| --- | --- | --- |
| 1,442,452 | Taylor | Jan. 16, 1923 |
| 1,656,184 | Enz | Jan. 17, 1928 |
| 1,842,382 | Arey | Jan. 26, 1932 |
| 1,989,009 | Heggem | Jan. 22, 1935 |
| 2,095,136 | Jaussaud | Oct. 5, 1937 |

FOREIGN PATENTS

| Number | Country | Date |
| --- | --- | --- |
| 785,155 | France | of 1935 |